United States Patent [19]
Francel et al.

[11] 3,907,585
[45] Sept. 23, 1975

[54] METHOD OF PRODUCING A SEALING GLASS COMPOSITION WITH A UNIFORM VISCOSITY

[75] Inventors: Josef Francel; James E. King, both of Toledo, Ohio

[73] Assignee: Owens-Illinois, Inc., Toledo, Ohio

[22] Filed: Feb. 19, 1974

[21] Appl. No.: 443,207

Related U.S. Application Data

[63] Continuation-in-part of Ser. No. 421,035, Dec. 3, 1973, abandoned.

[52] U.S. Cl. .................................. 106/53; 106/47 R
[51] Int. Cl. ......... C03c 3/12; C03c 3/00; C03c 1/02
[58] Field of Search ................... 106/47 Q, 47 R, 53

[56] References Cited
UNITED STATES PATENTS
3,088,834  5/1963  Pirooz .................................. 106/53
3,127,278  3/1964  Hagedorn ............................ 106/53

Primary Examiner—Winston A. Douglas
Assistant Examiner—Mark Bell
Attorney, Agent, or Firm—Henry P. Stevens; Edward J. Holler

[57] ABSTRACT

A method of producing a solder glass paste composition possessing uniform viscosity and highly improved stability by the employment of critical mixing procedures such as the rate and order of combining the paste constituents and the time, rate and temperature of mixing the same. The resultant paste composition is especially suitable for sealing together prefabricated glass components such as glass face plate and funnel components of a color television picture tube bulb.

19 Claims, No Drawings

METHOD OF PRODUCING A SEALING GLASS COMPOSITION WITH A UNIFORM VISCOSITY

RELATED APPLICATIONS

The present application constitutes a continuation-in-part of our copending U.S. Pat. Application, Ser. No. 421,035, filed Dec. 3, 1973, now abandoned.

BACKGROUND OF THE INVENTION

With the advent of color television, it has been conventional practice to use relatively low-softening temperature glass compositions, commonly and frequently referred to in the art as solder glass compositions, of the type primarily composed of the oxides of lead, boron and zinc as a means of sealing together separately fabricated glass components of a color television bulb. More particularly, it has become conventional procedure to assemble and unite the glass face plate component together with the glass funnel component of a color television picture tube bulb in such manner. Typical of such conventional practice is the procedure described in U.S. Pat. No. 3,127,278 issued Mar. 31, 1964 jointly to Erwin C. Hagedorn and the inventor herein. As clearly recognized in the aforementioned patent, to facilitate application, the solder glass may be prepared in the form of a paste wherein the solder glass is present in the paste in a finely milled or comminuted condition as a frit, and in homogeneous admixture with a suitable pyrolyzable carrier of a type which is not prone to leave residual foreign or carbonaceous deposits in the completed solder glass seal.

To date, one of the most successful pyrolyzable types of carrier systems for such solder glass pastes has been a solvent-binder system employing a 1 to 1.4 weight percent solution of nitrocellulose in amyl acetate. An example of such a solvent-binder system employing a one percent (1%) by weight solution of nitrocellulose in amyl acetate is discussed in, among others, U.S. Pat. No. 3,088,834 issued May 7, 1963 to P. P. Pirooz. Among the various attributes of a solvent-binder system of the amyl acetate and nitrocellulose type is that the system is both pyrolyzable at temperatures below the sealing temperature of the solder glass frit and does not produce or leave any appreciable residual substance or contaminant matter which would deleteriously affect the solder glass frit material or the resultant seal which is ultimately formed. As a consequence, solder glass pastes employing amyl acetate and nitrocellulose as a carrier, or solvent-binder system, have attained wide acceptance among color television picture tube manufacturers, since the use of such pastes tends to eliminate possible objectionable strength or electrical problems in the resultant seal of a completed, vacuumized, high voltage, color television tube. For example, localized sources of dielectric breakdown and/or strength weaknesses frequently have resulted from seal contamination, or the like, when solvent-binder systems other than the widely accepted amyl acetate and nitrocellulose types have been used.

Notwithstanding the many advantages and wide commercial acceptance of solder glass pastes, such as those primarily composed of the oxides of lead, boron and zinc, employing amyl acetate and nitrocellulose solvent-binder systems, there has been a strong desire to improve the properties of such solder glass pastes and especially to reduce or substantially mitigate the tendency of such pastes to undergo property changes during prolonged storage periods and during prolonged exposure to the ambient conditions existing during use or application of such pastes in commercial manufacturing operations. For example, it is common practice, especially in commercial manufacturing operations of television tube manufacturers, to apply the solder glass paste in the form of a narrow extruded ribbon onto the seal edge of each of a continuous succession of glass funnel or face plate components being processed through the manufacturing operations. The supply of solder glass paste for the paste extruder is customarily replenished from a sizeable reservoir of solder glass paste material which is subject to substantial and progressive changes in viscosity characteristics over relatively short periods of reservoir storage time. As a consequence of such viscosity changes, when a ribbon of solder glass paste is extruded for application purposes, there is a progressive tendency for the flowability and/or extrudability of the issuing ribbon of paste to change considerably over a relatively short period of time. Such change or variation in flowability or extrudability results in attendant and progressive changes in the width or shape of the ribbon of paste being extruded, as well as in the weight per unit length thereof. Consequently, the extruder mechanism or device must be constantly adjusted and readjusted in order to maintain uniformity in the shape and weight per unit length of the ribbon and to compensate for the progressively occurring changes in the viscosity of the paste. Failure to compensate for such progressive changes in the paste viscosity can result in the extrusion of too much or too little paste, or in the extrusion of too broad or too narrow a ribbon, and in turn result in a defective seal between the components being sealed. Typically, in sealing the funnel to the face plate component of a color television picture tube bulb, too broad a ribbon of solder glass paste ordinarily results in much of the paste composition being forced or squeezed out from between the juxtaposed, complemental surfaces of the funnel and face plate, whereas too narrow a ribbon ordinarily results in insufficient adhesion of the paste and produces subsequent blistering and peeling of the sealing glass.

In order to circumvent the stability and viscosity problems of solder glass paste compositions of the types described above, considerable effort has been expended in formulating and preparing such compositions just prior to their applicatiton from a dispensing apparatus. In keeping with such effort to reduce the overall extent of viscosity change and to retain an optimal stability in the paste, it has been necessary to continually prepare relatively small batches of fresh paste during and immediately preceding commercial dispensing or extruding operations. The time and effort involved in such small batch procedures, while heretofore necessary, obviously involves considerable labor, equipment and maintenance costs and is undesirable for production-line, manufacturing operations.

As a consequence, there is a great need for improvement in the stability and shelf-life characteristics of sealing paste materials of the type discussed herein, and such need is especially emphatic in production-line sealing operations such as are employed in the commercial manufacture of color television picture tube bulbs.

SUMMARY OF THE INVENTION

It has now been discovered that sealing glass or solder glass paste compositions of the type containing lead oxide can be formulated with carrier vehicles, or solvent-binder systems such as nitrocellulose, hydroxypropylcellulose or mixtures thereof in solvents such as amyl acetate, ethyleneglycol monomethyl ether or mixtures of both, in such manner that the resultant pastes possess substantially prolonged shelf-life and highly stable viscosity characteristics, provided certain critical parameters are observed in the process of paste preparation and formulation. Consequently, the problems of the past, which have been experienced in production-line utilization of solder glass paste materials, such as instability, constant attention by an operator and ever-changing paste consistency and viscosity are effectively overcome.

To this end, the present invention involves admixing under relatively precise conditions in a high velocity stirrer device a glass frit or powder with a solvent-binder system such as a liquid carrier vehicle comprising a cellulose derivative such as nitrocellulose or hydroxypropylcellulose or both in a solvent therefor such as amyl acetate. More particularly, the glass frit or powder must be admixed with the liquid carrier vehicle at a closely controlled rate of from 1 to 1.875 parts by weight per minute for each part by weight of vehicle, and carried out in such manner that two-thirds by weight of said powder is thoroughly admixed with the liquid vehicle at a stirrer or mixing speed of 400 to 850 revolutions per minute and in such furthermanner that the remaining frit or powder is similarly admixed at a mixing speed of 1,500 to 1,900 revolutions per minute. Throughout the mixing operation, the temperature should be maintained below 100°F.

After mixing, the solder glass paste composition should be promptly stored and maintained at a storage temperature of from 32° to 90°F. until used preferably within 24 hours. When the critical parameters hereinbefore set forth are observed, a solder glass paste composition of uniform viscosity is produced which is particularly well-suited for productionline types of solder glass paste sealing operations, such as are commonly employed by color television tube manufacturers in the sealing together of the face plate and funnel components of color television picture tube bulbs.

GENERAL DESCRIPTION OF THE INVENTION

The solder glass frit, or powder, used in this invention can be any of those which are commercially available and preferably one having a composition within the percent by weight ranges of 75 to 82% PbO, 7 to 14% ZnO, 6 to 12% $B_2O_3$, 1 to 3% $SiO_2$ and 0 to 2% BaO.

PbO-containing solder glasses, and particularly PbO-$B_2O_3$-ZnO solder glasses, of the type most commonly used commercially are those which have the property of softening and flowing at low temperatures, i.e. usually below 500°C. and preferably below 475°C., and which facilitate the wetting of the glass surfaces to be sealed. Furthermore, the devitrified or crystallized seal which is formed has a fiber softening point which is higher than that of the original sealing glass. Other metal oxides may also be present in amounts, usually less than 5% by weight, as long as such oxides are compatible with the glass and do not materially alter the basic characteristics of the glass or of the devitrified seal formed therefrom. If desired, the solder glass frit or paste material may also be composed of relatively small, but effective, amounts of other compatible non-frit glass constituents. Among such various compatible non-frit glass constituents found to be particularly well-suited for solder glass pastes employed in sealing the face plate and funnel components of color television tube bulbs are those oxides having a cation which is stable at the sealing temperatures at which the solder glass frit constituent of the paste seals the face plate and funnel components together and which also can be reduced to a lower valence oxide of the cation under exposure to reducing conditions in the presence of such sealing temperatures. Examples of such constituents are $Pb_3O_4$ and $BaO_2$ and the like. All of these frits should contain particles having a size distribution such that all of the particles pass through a 100 mesh screen and 25 to 30% of said particles are retained on a 400 mesh screen as measured by the U.S. Standard Sieve Series of 1940 and the surface area of the particles varies from a minimum of about 1.5 to a maximum of about 2.0 square meters per cubic centimeter.

The nitrocellulose employed as a binder in the present compositions can have a molecular weight of from 20,000 to 120,000 and preferably about 100,000. The molecular weight of hydroxypropylcellulose can vary from 40,000 to 300,000 and preferably about 60,000. Either of these celluloses can be used alone, but stability is greatly enhanced if a mixture of both is employed. In general, one uses a solution of from 1 to 1.4% by weight of nitrocellulose in a solvent such as amyl acetate or ethyleneglycol monomethylether and preferably mixtures of said solvents or from 1 to 5% by weight of hydroxypropylcellulose in the same solvents. Other known binders may also be utilized in the glass paste compositions of the invention provided they hold the glass frit in a ribbon form long enough to join and seal the face plate to the funnel components of a color television picture tube bulb and are pyrolyzable at the sealing temperatures employed.

Although amyl acetate is highly preferred as a solvent for the binder since it volatilizes rapidly, ethyleneglycol monomethylether is also suitable either per se or mixed with amyl acetate. Other solvent-binder systems which are satisfactory include methyl amyl acetate, ethyl hexyl acetate, n-butyl acetate, isobutyl acetate, secondary butyl acetate, ethyleneglycol monoethylether and diethyleneglycol monobutylether.

In carrying out the critical steps of the present invention, one first mixes the nitrocellulose or hydroxypropylcellulose with the solvent (preferably amyl acetate) at room temperature. Assuming that a 540 pound batch of solder glass paste composition is desired, one begins with a liquid carrier vehicle or solvent-binder system, containing 36 pounds of solvent and 4 pounds of a cellulose binder. To said vehicle is added 330 pounds of a lead oxide containing solder glass frit at a rate of from 40 to 75 pounds per minute while stirring at a stirrer speed of about 700 revolutions per minute. Next, the remaining 170 pounds of glass frit is added at the same rate while stirring at a stirrer speed of about 1,700 revolutions per minute. Heat is evolved during the mixing of the glass frit and liquid vehicle.

The order of addition and the rate of addition of the ingredients are critical in controlling the heat evolved which must be held below 100°F. In other words, the solder glass frit is always added to the vehicle and never in reverse order. Likewise, the rate of addition of the solder glass frit must be maintained within the ranges specified in order to control the heat generated. Since the viscosity of the composition increases as more solder glass frit is added, more rapid agitation is required during the later stages of the mixing procedure in order to achieve uniform dispersion.

Higher mixing speeds than those designated in the first stage of preparation will introduce too much air and also may tend to force the carrier vehicle over the edges of the mixing vessel, whereas slower speeds than those designated in the second stage do not provide sufficiently uniform blending and higher speeds in the latter stage generate excessive heat causing the viscosity of the final composition to increase due to excessive evaporation of the solvent. When employing a mixing vessel of about 18 gallon capacity, the mixing blades should be stationed very close to the bottom of the mixing vessel during the first stage of mixing, but should be raised 3 to 5 inches during the second stage of mixing when the mixing speed is increased from 700 to 1,700 RPM in order to effectively blend the incoming solder glass frit. If mixing vessels of smaller or larger capacity are used, the position of the mixing blades should be adjusted accordingly to assure thorough mixing. After mixing, the composition should be stored at temperatures above freezing but below 90°F. and preferably at 75°F.

DESCRIPTION OF THE PREFERRED EMBODIMENTS

EXAMPLE 1

A four percent (4%) by weight hydroxypropylcellulose solution was prepared by placing 150 parts by weight of amyl acetate, which had previously been heated to 140°F., into a suitable container and adding slowly with stirring 24 parts by weight of hydroxypropylcellulose having an average molecular weight of 60,000. Thereafter, another 150 parts by weight of amyl acetate was added followed by 300 parts by weight of ethyleneglycol monomethylether.

Two pounds of the hydroxypropylcellulose solution thus prepared was added to 38 pounds of an amyl acetate solution containing 1.3% by weight of nitrocellulose having a molecular weight of 100,000 in an 18 gallon epoxy lined, steel mixing vessel equipped with a mechanical, blade-type stirrer driven by a 10 horsepower variable speed motor. The mixture was stirred at 700 RPM for one minute. The stirrer was then positioned about one inch from the bottom of the mixing vessel and the stirrer speed was maintained at 700 RPM while powdered solder glass frit containing 75.5% by weight of PbO, 8.5% by weight of $B_2O_3$, 12% by weight of ZnO, 2% by weight of $SiO_2$ and 2% by weight of BaO admixed with 0.25% of particulate $Pb_3O_4$ based upon the weight of the frit was added at a rate of 75 pounds per minute. The particle size distribution of the frit glass particles was that all of the particles passed through a 100 mesh screen and such that 25 to 30% of the frit glass particles were retained on a 400 mesh screen, as measured by the U.S. Standard Sieve Series of 1940, and such that the surface area of the particles varied from a minimum of 1.5 to a maximum of 2.0 square meters per cubic centimeter. Upon completion of the addition of 330 pounds of the solder glass frit, stirring was continued for one minute before elevating the stirrer blades 3 inches. Stirrer speed was then increased to 1,700 RPM and promptly followed by the addition of another 170 pounds of solder glass frit over a period of 2.5 minutes while maintaining a vortex in the mixing composition. When the mixing composition appeared to have a uniform consistency, the stirrer blade was lowered to the bottom of the mixing vessel and slowly raised upwardly through the viscous solder glass paste composition to assure maximum uniformity. Stirring was finally terminated and the solder glass paste was quickly sealed within the mixing vessel for storage. When the solder glass paste composition thus prepared was subsequently dispensed in ribbon form at a consant dispensing pressure, there was a 7% variation in the width of the ribbon after 4 hours and 13% variation after 16 hours.

EXAMPLE 2

Forty pounds of an amyl acetate solution containing 1.2% by weight of nitrocellulose with a molecular weight of 25,000 was placed in the mixing vessel described in Example 1 and with the stirrer placed about one inch from the bottom of the vessel, stirring was started at 700 RPM while 330 pounds of a powdered solder glass frit $Pb_3O_4$ admixture having the composition set forth in Example 1 was added in a sprinkling motion at a rate of 75 pounds per minute. The stirrer was then raised 4 inches and the speed increased to 1,700 RPM before adding at the same rate 170 pounds more of the solder glass frit and $Pb_3O_4$ admixture. Finally, the stirrer was lowered to the bottom of the mixing vessel and then raised slowly through the mixture. The temperature increased during the mixing but did not exceed 90°F. When the mixing was complete, the solder glass paste composition was immediately dispensed as a ribbon. The relatively minimal variation in width of the ribbon of paste due to the uniform viscosity of the composition was only about 11% after 4 hours and 21% after 16 hours. By comparison, the same composition when prepared according to customary commercial procedures and dispensed under a constant dispensing pressure varied by 15% in width after 4 hours and by 29% in width after 16 hours.

EXAMPLE 3

To 40 pounds of the two component vehicle of Example 1 was added 330 pounds of a powdered solder glass frit and $Pb_3O_4$ admixture having the same compositional characteristics as in Example 1 at a rate of 40 pounds per minute while maintaining a stirrer speed of 500 RPM. Following completion of this first stage addition, stirring was continued at the same stirrer speed for 5 additional minutes. Thereafter, the stirrer speed was increased to 1,500 RPM and the remaining 170 pounds of solder glass frit and $Pb_3O_4$ admixture was added at the same rate. Stirring then was continued for one minute after completion of the second stage addition. The stirrer was thereafter moved to the bottom of the 18 gallon mixing vessel and then moved slowly to the top thereof to complete the uniform dispersion of the glass frit and $Pb_3O_4$ admixture in the vehicle. The solder glass paste composition was then quickly sealed for storage within the mixing vessel. When ultimately dispensed as a ribbon, no significant variation in width or weight per unit of length was observed in the ribbon even after continued extrusion for several hours on color television picture tube funnels.

EXAMPLE 4

The same vehicle and procedure described in Example 1 was used except that the glass frit was not admixed with and did not contain $Pb_3O_4$ and was added at a rate of 60 pounds per minute to the amyl acetate and nitrocellulose — hydroxypropyl cellulose carrier vehicle at a mixing speed of 600 RPM in the first stage and 1,800 RPM in the second stage. The glass paste composition obtained was of uniform viscosity and when dispensed produced a ribbon in which the width and weight per unit of length remained substantially constant over a period of several hours.

EXAMPLE 5

In this example a solder glass frit having the same compositional and particle size characteristics as the solder glass frit described in Example 1 was admixed with finely comminuted particles of $BaO_2$ to produce a uniform admixture containing 0.25% by weight of $BaO_2$. This solder glass frit admixture then was employed to prepare a final solder glass paste possessing a solder glass frit and $BaO_2$ to carrier vehicle weight ratio of 11.3:1. The carrier vehicle used in this example was a 1 to 1 mixture of amyl acetate and ethyleneglycol monomethylether containing 1.33% by weight of hydroxypropylcellulose having a molecular weight of only 300,000.

To 44.2 pounds of the carrier vehicle contained within a mixing vessel of the type described in Example 1 was added 330 pounds of the solder glass frit and $BaO_2$ admixture. With respect to the rate of addition, temperature control and stirrer blade positioning and rotation, the procedures followed in this instance were the same as those followed in the first stage frit addition in Example 1. Thereafter, and again following the same procedures described in Example 1, 170 additional pounds of the admixture of solder glass frit and $BaO_2$ were added to and thoroughly mixed with the carrier vehicle. The resultant solder glass paste composition was uniform in viscosity and possessed exceptional stability over prolonged periods of ribbon extrusion operations.

EXAMPLE 6

The carrier vehicle used in this example comprised 90 parts by weight of a 1.2% by weight nitrocellulose (molecular weight 120,000) solution in amyl acetate and 10 parts by weight of a 4% by weight hydroxypropylcellulose (molecular weight 60,000) solution in equal parts by weight of amyl acetate and ethyleneglycol monomethylether. The solder glass frit-$Pb_3O_4$ admixture and procedure employed was the same as that in Example 1 with the exception that the carrier vehicle in this example was employed in a weight ratio of 42.7 pounds of carrier vehicle to 500 pounds of the admixture of $Pb_3O_4$ and solder glass frit to thereby produce a solder glass frit — $Pb_3O_4$ to carrier vehicle weight ratio of 11.7:1. The solder glass paste composition thus produced was very stable, of uniform viscosity and when dispensed as a ribbon only very slight variations in width or weight per unit of length were observed.

EXAMPLE 7

A vehicle was prepared containing 70 parts by weight of a 1.2 weight percent nitrocellulose (molecular weight 20,000) solution in amyl acetate and 30 parts by weight of a 10 percent by weight solution of hydroxypropylcellulose (molecular weight 60,000) in equal parts of amyl acetate and ethyleneglycol monoethylether. To 38.9 pounds of the vehicle thus prepared was added 330 pounds of the solder glass frit used in Example 1 admixed with 0.5% by weight thereof of $Pb_3O_4$. The addition of material was made at the rate of 75 pounds per minute and at a mixer speed of 700 RPM. The mixer speed was then increased to 1,700 RPM and 170 pounds of glass frit and $Pb_3O_4$ admixture was added at the same rate of 75 pounds per minute. The final composition produced was uniform in viscosity and suitable for extrusion as a ribbon on color television funnels and face plates.

EXAMPLE 8

A carrier vehicle was first prepared comprising 95 parts by weight of amyl acetate containing 6.2% by weight of nitrocellulose with a molecular weight of 75,000 and 5 parts by weight of equal parts of amyl acetate and ethyleneglycol monoethylether containing 4% by weight of hydroxypropylcellulose having a molecular weight of 50,000. A glass frit — $Pb_3O_4$ admixture was next prepared containing on a weight basis 75% PbO, 12.6% ZnO, 8.3% $B_2O_3$, 2.1% $SiO_2$ and 2% BaO admixed with 0.5% of particulate $Pb_3O_4$ based upon the weight of the frit. Thereafter, 38.7 pounds of the carrier vehicle was poured into an 18 gallon mixer of the type described in Example 1 and stirred at 700 RPM for one minute. Finally, the glass frit — $Pb_3O_4$ admixture was added in the same amounts and by the exact procedure described in Example 1 to obtain a smooth flowing solder glass paste composition, the viscosity of which remained constant when dispensed as a ribbon on the funnel of colored television picture tube bulbs.

$Pb_3O_4$ have been employed as particulate additives admixed with the solder glass frit in certain of the foregoing examples. The utilization of such particulate additives as $Pb_3O_4$ and $BaO_2$ in admixture with solder glass frit compositions of the type described herein have been found to be particularly beneficial to preclude the tendency of the PbO component of the solder glass frit to be reduced to metallic lead under exposure to severe ambient reducing conditions or environments which are sometimes encountered during frit sealing at elevated temperatures. Among such frit sealing operations where exposure of the solder glass frit to reducing conditions is relatively prevalent, are those encountered in the sealing of the face plate and funnel components of color television picture tube bulbs. Accordingly, for such types of sealing operations the inclusion of such additives as $Pb_3O_4$ or $BaO_2$ to the solder glass frit may, according to the severity of the reducing conditions, be preferable.

Although a solder glass frit to carrier vehicle weight ratio of from 11.3 to 1 to 12.5 to 1 was used in the illustrative examples, ratios of 11 to 13 parts of solder glass frit per one part of carrier vehicle by weight may be used if desired without detrimental effects.

We claim:

1. In a method of producing a solder glass paste composition of uniform viscosity which comprises adding and mixing a solder glass frit with a carrier vehicle consisting essentially of a binder for said frit and a solvent for said binder, the improvement comprising adding at a temperature of about 32° to 100°F. two-thirds by weight of the solder glass frit to the carrier vehicle at a rate of from 1 to 1.875 parts by weight of the solder glass frit per minute for each part by weight of the carrier vehicle while concurrently mixing the same at a mixing speed of 400 to 850 revolutions per minute to obtain a frit to vehicle weight ratio of from about 7.3:1 to about 8.7:1 and then adding the remaining one-third of the solder glass frit to the carrier vehicle at a rate of from 1 to 1.875 parts by weight of the solder glass frit per minute for each part by weight of the carrier vehicle while concurrently mixing the same at a mixing speed of 1,500 to 1,900 revolutions per minute.

2. A method as defined in claim 1 including admixing the solder glass frit with a sufficient amount of a higher oxide selected from at least one of the group of higher oxides consisting of $Pb_3O_4$ and $BaO_2$.

3. The method as defined in claim 2 in which the higher oxide is $Pb_3O_4$.

4. The method as defined in claim 2 in which the higher oxide is $BaO_2$.

5. A method as defined in claim 1 including selecting the solder glass frit to possess a composition within the compositional range of 75 to 82% by weight of PbO, 7 to 14% by weight of ZnO, 6 to 12% by weight of $B_2O_3$ and 1 to 3% by weight of $SiO_2$ and to possess size distribution such that all of the particles will pass through a 100 mesh screen and such that 25 to 30% of said particles will be retained on a 400 mesh screen as measured by the U.S. Standard Sieve Series of 1940 and such that the surface area of the particles varies from a minimum of about 1.5 to maximum of about 2.0 square meters per cubic centimeter.

6. A method as defined in claim 1 including admixing the solder glass frit with from 0.1 to 1.5% of $Pb_3O_4$ by weight of the solder glass frit.

7. A method as defined in claim 1 including selecting the binder from the group consisting of nitrocellulose having a molecular weight within the range of from about 20,000 to about 120,000 and hydroxypropylcellulose having a molecular weight within the range of from about 40,000 to about 300,000 and mixtures thereof.

8. A method as defined in claim 7 including selecting as the binder nitrocellulose with a molecular weight of from about 20,000 to about 120,000.

9. A method as defined in claim 7 including selecting as the binder hydroxypropylcellulose with a molecular weight of from 40,000 to 300,000.

10. A method as defined in claim 7 including selecting as the binder a mixture of nitrocellulose with a molecular weight of about 100,000 and hydroxypropylcellulose with a molecular weight of about 60,000.

11. A method as defined in claim 1 including selecting as the solvent for the binder a solvent from the group consisting of butyl acetate, amyl acetate, methyl amyl acetate, ethyl hexyl acetate, ethyleneglycol monomethylether, ethyleneglycol monoethylether or diethyleneglycol monobutylether and mixtures thereof.

12. A method as defined in claim 11 including selecting amyl acetate as the solvent.

13. A method as defined in claim 11 including selecting ethyleneglycol monomethylether as the solvent.

14. A method as defined in claim 11 including selecting as the solvent a mixture of amyl acetate and ethyleneglycol monomethylether.

15. A method as defined in claim 1 including adding essentially all of the solder glass frit at a rate of about one part by weight per minute for each part by weight of carrier vehicle.

16. A method as defined in claim 1 including adding essentially all of the solder glass frit at a rate of about 1.875 parts by weight per minute for each part by weight of carrier vehicle.

17. A method as defined in claim 1 including adding two-thirds of the solder glass frit to the carrier vehicle at a mixing speed of about 700 revolutions per minute and adding the remaining one-third of the solder glass frit at a mixing speed of about 1,700 revolutions per minute.

18. A method of preparing a solder glass paste composition possessing properties of uniform viscosity and improved stability, said method comprising:

a. providing a carrier vehicle consisting essentially of 95 parts by weight of a 1.3 by weight solution of nitrocellulose having a molecular weight of about 100,000 in amyl acetate together with 5 parts by weight of a 4% by weight solution of hydroxypropylcellulose in equal parts by weight of amyl acetate and ethyleneglycol monomethylether, b. providing a particulate solder glass frit having a composition within the compositional weight percent range of 75 to 82% PbO, 7 to 14% ZnO, 6 to 12% $B_2O_3$ and 1 to 3% $SiO_2$ and possessing a particle size distribution such that essentially all of the particles of solder glass frit pass through a 100 mesh screen and such that about 25 to 30% of the particles of solder glass frit are retained on a 400 mesh screen, both as measured by the U.S. Standard Sieve Series of 1940, and such that the surface area of the particles varies from a minimum of about 1.5 to a maximum of about 2.0 square meters per cubic centimeter, c. stirring said carrier vehicle in a blade-type mixing vessel at a blade stirring speed of about 400 to 850 revolutions per minute while concurrently adding a sufficient amount of solder glass frit to said carrier vehicle to provide a solder glass frit to carrier vehicle ratio of from about 7.3 to about 8.7 parts by weight of solder glass frit to one part by weight of carrier vehicle, the addition of solder glass frit to carrier vehicle being a rate of addition per minute of 1 to 1.875 parts by weight of solder glass frit to one part by weight of carrier vehicle, d. thereafter increasing the stirring speed to a blade stirring speed of from about 1,500 to 1,900 revolutions per minute while concurrently adding sufficient amount of said solder glass frit at a rate of addition per minute of 1 to 1.875 parts by weight of solder glass frit to one part by weight of carrier vehicle to produce a solder glass frit to carrier vehicle ratio of from about 11 to about 13 parts by weight of solder glass frit to one part by weight of carrier vehicle.

19. A method as defined in claim 18 including the conducting of the stirring of said carrier vehicle at a blade stirring speed of about 400 to 850 revolutions per minute at a frit stirring location disposed near to the bottom of said mixing vessel and conducting the stirring of said carrier vehicle at a blade stirring speed of about 1,500 to 1,900 revolutions per minute at a second stirring location disposed intermediate said first stirring location and the surface level of said carrier vehicle.

* * * * *